(12) United States Patent
Oba et al.

(10) Patent No.: US 9,539,799 B2
(45) Date of Patent: Jan. 10, 2017

(54) MANUFACTURING METHOD FOR LAMINATED CORE AND MANUFACTURING APPARATUS THEREFOR

(71) Applicant: MITSUI HIGH-TEC, INC., Kitakyushu-shi, Fukuoka (JP)

(72) Inventors: Yukinori Oba, Kitakyushu (JP); Hirokazu Arakawa, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 284 days.

(21) Appl. No.: 14/349,449

(22) PCT Filed: Oct. 1, 2012

(86) PCT No.: PCT/JP2012/075399
§ 371 (c)(1),
(2) Date: Apr. 3, 2014

(87) PCT Pub. No.: WO2013/073300
PCT Pub. Date: May 23, 2013

(65) Prior Publication Data
US 2014/0231003 A1    Aug. 21, 2014

(30) Foreign Application Priority Data

Nov. 17, 2011   (JP) .................................. 2011-251854

(51) Int. Cl.
| | |
|---|---|
| *B32B 38/04* | (2006.01) |
| *H02K 15/02* | (2006.01) |
| *B21D 28/02* | (2006.01) |
| *B21D 28/06* | (2006.01) |

(52) U.S. Cl.
CPC .............. *B32B 38/04* (2013.01); *H02K 15/02* (2013.01); *B21D 28/02* (2013.01); *B21D 28/06* (2013.01);
(Continued)

(58) Field of Classification Search
CPC ....... B21D 28/02; B21D 28/06; H05K 15/022; H05K 15/024; H05K 15/02; B23P 21/004; Y10T 156/1056; Y10T 156/1062; Y10T 156/1075; Y10T 156/13
See application file for complete search history.

(56) References Cited

U.S. PATENT DOCUMENTS

| | | |
|---|---|---|
| 2003/0062133 A1 | 4/2003 | Shirai et al. |
| 2009/0025203 A1 | 1/2009 | Tanaka et al. |
| | (Continued) | |

FOREIGN PATENT DOCUMENTS

| | | |
|---|---|---|
| CN | 101989788 A | 3/2003 |
| CN | 102714449 A | 10/2012 |
| | (Continued) | |

OTHER PUBLICATIONS

Extended European Search Report dated Dec. 15, 2015, issued in counterpart European Patent Application No. 12850111.1. (7 pages).

(Continued)

*Primary Examiner* — Linda L Gray
(74) *Attorney, Agent, or Firm* — Westerman, Hattori, Daniels & Adrian, LLP

(57) ABSTRACT

A laminated core manufacturing method for performing rotational lamination by conveying a band-shaped material to be stamped 10 to a die apparatus to successively perform presswork, stamping out and dropping manufactured core pieces 20 into a blanking die 21 and rotating the blanking die 21 by a predetermined angle, in which a positioning mechanism for the blanking die 21, which has rotational lamination guide pins and rotational lamination guide holes 23-30, is disposed inward from both ends in a width direction of the band-shaped material to be stamped 10 and temporary holes 13-16 for the rotational lamination guide pins to be inserted are provided in the band-shaped material to be stamped 10. The structure allows downsizing of the die apparatus.

6 Claims, 3 Drawing Sheets

(52) U.S. Cl.
CPC ....... *B32B 2038/042* (2013.01); *H02K 15/022* (2013.01); *H02K 15/024* (2013.01); *Y10T 156/1056* (2015.01); *Y10T 156/1062* (2015.01); *Y10T 156/1075* (2015.01); *Y10T 156/12* (2015.01); *Y10T 156/13* (2015.01)

(56) References Cited

U.S. PATENT DOCUMENTS

| | | |
|---|---|---|
| 2011/0024489 A1 | 2/2011 | Sakakibara et al. |
| 2011/0232076 A1 | 9/2011 | Matsubara et al. |

FOREIGN PATENT DOCUMENTS

| | | |
|---|---|---|
| DE | 112011100132 T5 | 9/2012 |
| JP | 59-059047 A | 4/1984 |
| JP | 2003-116252 A | 4/2003 |
| JP | 2009-195099 A | 8/2009 |
| JP | 2011-036039 A | 2/2011 |
| JP | 2011-182582 A | 9/2011 |
| JP | 2011-205836 A | 10/2011 |
| WO | 2011/118264 A1 | 9/2011 |

OTHER PUBLICATIONS

Office Action dated Dec. 18, 2015, issued in counterpart Chinese Patent Application No. 201280048036.6, with English translation. (16 pages).

International Search Report for PCT/JP2012/075399, Mailing Date for Dec. 4, 2012.

Second Notice of Reasons for Refusal dated Jul. 19, 2016, issued in counterpart Chinese Patent Application No. 201280048036.6, with English translation. (6 pages).

PRIOR ART

MANUFACTURING METHOD FOR LAMINATED CORE AND MANUFACTURING APPARATUS THEREFOR

TECHNICAL FIELD

The present invention relates to a method for manufacturing a laminated core and an apparatus for manufacturing the same in which core pieces are stamped out from a band-shaped material to be stamped and are laminated in a blanking die and the blanking die is rotated (called as rotational lamination).

BACKGROUND ART

When manufacturing a laminated core by laminating individual core pieces in a die, to prevent deviation in lamination thickness of the laminated core due to thickness deviations of the respective core pieces, rotational lamination is performed by rotating a blanking die by a predetermined angle for each or a plurality of the core pieces. As a positioning mechanism for the rotatable blanking die, rotational lamination guide pins are generally used.

As illustrated in FIG. 3, rotational lamination guide holes 50 for performing the positioning by fitting with these rotational lamination guide pins (not illustrated) are provided in a blanking die 51. The rotational lamination guide pins and the rotational lamination guide holes 50 constitute the positioning mechanism. These rotational lamination guide holes 50, as illustrated in FIG. 3, are provided at positions not interfering with a band-shaped material to be stamped 52, i.e., at outer positions in a width direction of the band-shaped material to be stamped 52 (reference: Patent Literature 1). Here, numerals 53, 54, and 55 denote a lower die, pilot holes, and a stator outer circumferential die, respectively.

CITATION LIST

Patent Literature

Patent Literature 1: Japanese Unexamined Patent Application Publication No. Sho 59-59047

SUMMARY OF INVENTION

Technical Problem

However, in the case where the positioning mechanism is disposed outside of the band-shaped material to be stamped 52, the blanking die 51 will become inevitably large, which disadvantageously causes the die apparatus to increase in size.

The preset invention has been made in view of the above circumstances, and an object thereof is to provide a laminated core manufacturing method and a manufacturing apparatus therefor that are capable of downsizing the die apparatus.

Solution to Problem

To achieve the above object, according to a first aspect of the present invention, there is provided a laminated core manufacturing method for performing rotational lamination by conveying a band-shaped material to be stamped to a die apparatus to successively perform presswork, stamping out and dropping each manufactured core piece into a blanking die and rotating the blanking die by a predetermined angle, the method comprising: disposing a positioning mechanism for the blanking die inward from both ends in a width direction of the band-shaped material to be stamped, the positioning mechanism including rotational lamination guide pins and rotational lamination guide holes; and providing the band-shaped material to be stamped with temporary holes for the rotational lamination guide pins to be inserted therein, respectively.

To achieve the above object, according to a second aspect of the present invention, there is provided a laminated core manufacturing apparatus for performing rotational lamination by conveying a band-shaped material to be stamped to a die apparatus to successively perform presswork, stamping out and dropping each manufactured core piece into a blanking die and rotating the blanking die by a predetermined angle, the apparatus comprising: a positioning mechanism for the blanking die, the positioning mechanism being disposed inward from both ends in a width direction of the band-shaped material to be stamped and including rotational lamination guide pins and rotational lamination guide holes, wherein the rotational lamination guide pins are respectively fitted in the rotational lamination guide holes through temporary holes provided in the band-shaped material to be stamped.

In the laminated core manufacturing method and manufacturing apparatus according to the first and second aspects of the present invention, a plurality of the core pieces having different outer diameters may be concentrically stamped out from the band-shaped material to be stamped, or alternatively one type of the core pieces may be stamped out. Moreover, it is preferable that forming of the temporary holes is carried out simultaneously with forming of pilot holes used for producing the core piece.

In the laminated core manufacturing method and manufacturing apparatus according to the first and second aspects of the present invention, the temporary holes are formed in an outer region or an inner region of the core piece. Moreover, although the temporary holes preferably have a diameter in a range of 1.05 to 1.5 times the diameter of the rotational lamination guide pins (i.e., in a loosely fitted manner), the present invention is not limited to these numbers.

Advantageous Effects of Invention

In the laminated core manufacturing method and manufacturing apparatus according to the present invention, the positioning mechanism for the blanking die is disposed inward from the both ends in the width direction of the band-shaped material to be stamped, and further, the band-shaped material to be stamped is provided with the temporary holes for allowing the rotational lamination guide pins to be inserted therein, respectively. Such a construction allows the die apparatus to be downsized in the width direction thereof and the downsized die apparatus can be provided.

DESCRIPTION OF EMBODIMENTS

Preferred embodiments of the present invention will now be described hereunder with reference to the accompanying drawings.

Figure 1:
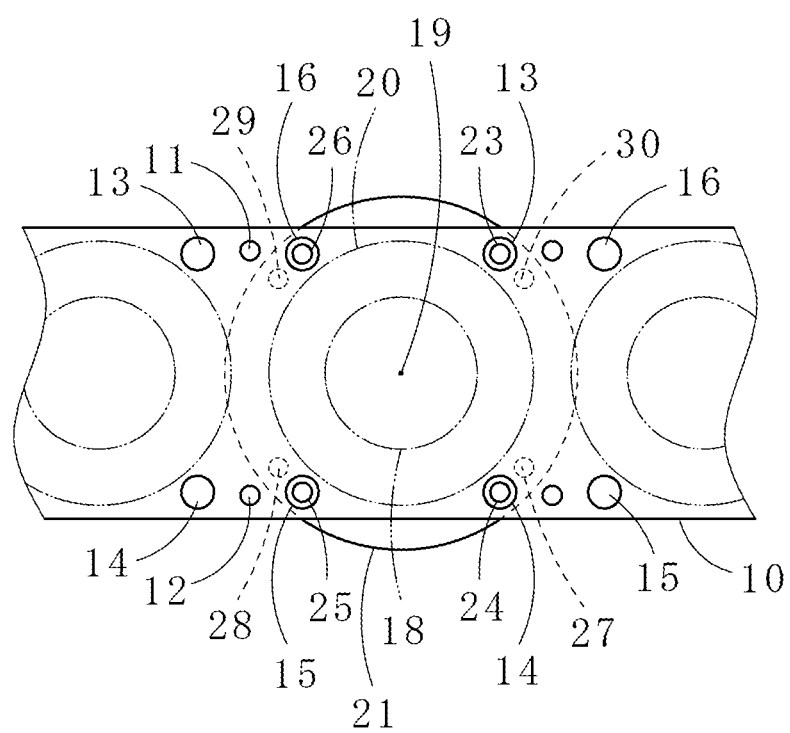
FIG. 1 is an explanatory diagram of a laminated core manufacturing method according to a first embodiment of the present invention.

As illustrated in FIG. 1, a manufacturing apparatus for performing a laminated core manufacturing method according to a first embodiment of the present invention successively feeds band-shaped plates to be stamped (an example of a band-shaped material to be stamped) 10 each made of a magnetic steel plate into a die apparatus not illustrated and punches and forms pilot holes 11, 12 and temporary holes 13-16 simultaneously on both sides in a width direction of the band-shaped plate to be stamped 10.

In this embodiment, since rotational lamination is carried out by 90 degrees (angle at which a blanking die 21 is rotated), rotational lamination guide holes 23-30 are formed at the same radial positions with reference to a center 19 of a central core piece 18 which is to be a rotor, and first rotational lamination guide holes (group) 23-26 and second rotational lamination guide holes (group) 27-30 are formed at positions rotated by 90 degrees relative to each other.

A rotational lamination device has a known structure and is operable to rotationally drive the blanking die 21 by a predetermined angle by a servomotor after stamping out and dropping the core pieces 20 into the blanking die 21. Meanwhile, the pilot holes 11 and 12 in this embodiment are formed on both sides of the band-shaped plate to be stamped 10 and in the central positions between adjoining temporary holes 13 and 16 and between temporary holes 14 and 15, respectively. The inner circular core pieces 18 are punched out using these pilot holes 11 and 12 as a reference. Subsequently, from the band-shaped plate to be stamped 10 from which the core pieces 18 have been removed by stamping, core pieces 20 for a stator, which are formed concentrically with the core pieces 18, are stamped out using the pilot holes 11 and 12 as a reference and dropped into the blanking die 21 at a final process.

A rotational angular position of the blanking die 21 and the position of the core piece 18 have been accurately set with rotational lamination guide pins, which are provided to an upper die and not illustrated, fitted in the first group of rotational lamination guide holes 23-26 or the second group of rotational lamination guide holes 27-30 of the blanking die 21 into which the core pieces 20 fall by being stamped out. The first group of rotational lamination guide holes 23-26 or the second group of rotational lamination guide holes 27-30 and the rotational lamination guide pins corresponding to these constitute a positioning mechanism for the blanking die 21. This positioning mechanism is disposed inward from both ends in the width direction of the band-shaped plate to be stamped 10. Moreover, through the temporary holes 13-16, the rotational lamination guide pins are inserted, respectively.

Figure 3:
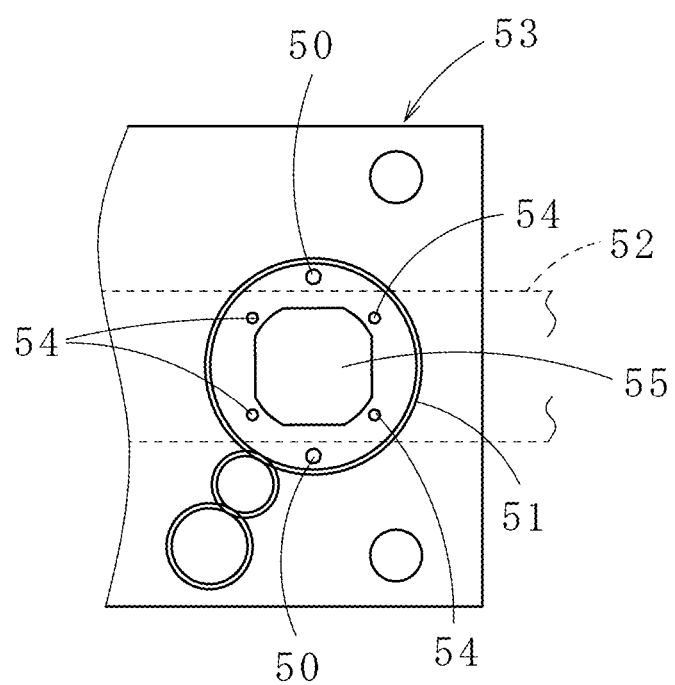
FIG. 3 is an explanatory diagram of a laminated core manufacturing method according to a conventional example.

Here, the blanking die 21 has a diameter sufficiently larger than the width of the band-shaped plate to be stamped 10 and extends from the both sides in the width direction of the band-shaped plate to be stamped 10. Since the upper die provided with the rotational lamination guide pins has only to have a width sufficient for entirely supporting the rotational lamination guide pins, the width thereof can be made narrower than that of the die shown in FIG. 3 (lower die 53). That is, the die can be downsized.

Moreover, since the temporary holes 13-16 are only required to have a size sufficient to allow the rotational lamination guide pins to be respectively loosely fitted therein, their diameter may be 1.05-1.5 times the diameter of the rotational lamination guide pins (this is also true in the following embodiment). As a result, the rotational lamination guide pins do not affect the positioning of the material.

In the laminated core manufacturing method and manufacturing apparatus according to the present embodiment, the band-shaped plate to be stamped 10 having a predetermined width is conveyed to the die apparatus and first the inner core pieces 18 are stamped out and dropped into a first blanking die (not illustrated) while rotational lamination is performed, thereby manufacturing a small-diameter laminated core. In this case, the positioning of the first blanking die is performed by using the rotational lamination guide holes.

With regard to the outer core pieces 20, the band-shaped plate to be stamped 10 is disposed at a predetermined position of the second blanking die 21, and the rotational lamination guide pins are inserted through the temporary holes 13-16 into the first group of rotational lamination guide holes 23-26 or the second group of rotational lamination guide holes 27-30 by lowering the upper die to perform positioning of the second blanking die 21, and then the outer core pieces 20 are stamped out and dropped into the second blanking die 21 (i.e., presswork is performed). The rotational lamination guide pins are removed from the first rotational lamination guide holes 23-26 or the second rotational lamination guide holes 27-30 by elevating the upper die, and the second blanking die 21 is rotated by a predetermined angle.

In such a manner, from the band-shaped plate to be stamped 10, the inner and outer core pieces 18 and 20 are rotationally laminated to manufacture laminated cores, respectively.

Next, a manufacturing method and a manufacturing apparatus for a laminated core according to a second embodiment of the present invention will be described while referring to FIG. 2.

Figure 2:
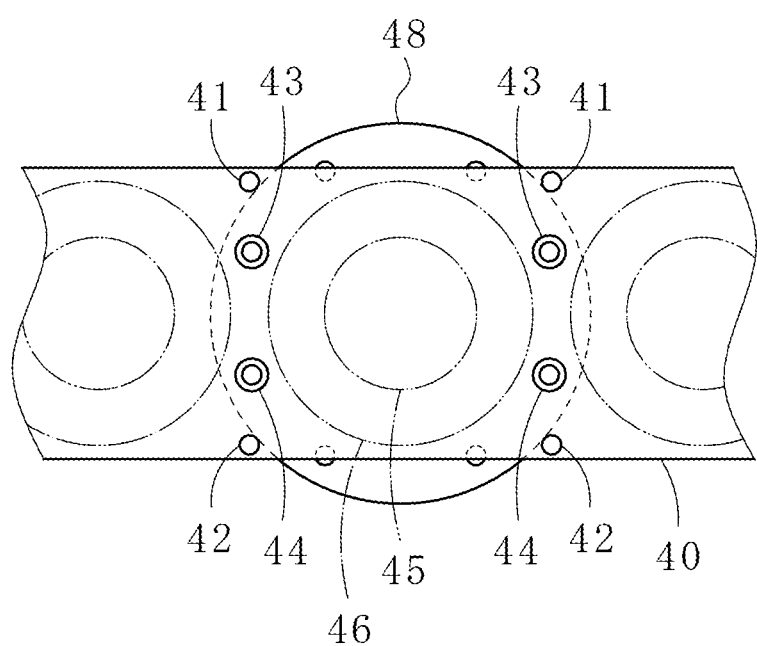
FIG. 2 is an explanatory diagram of a laminated core manufacturing method according to a second embodiment of the present invention.

In FIG. 2, pilot holes 41, 42 and temporary holes 43, 44 are formed within and on both sides in a width direction of a band-shaped plate to be stamped (an example of a band-shaped material to be stamped) 40. In this embodiment, two types of core pieces 45 and 46 are manufactured from a single sheet of the band-shaped plate to be stamped 40 and temporary holes can be shared by adjoining pitches (core pieces), thereby the number of the temporary holes per pitch can be reduced. Although a blanking die 48 in this case becomes larger than the width of the band-shaped plate to be stamped 40, since the width of the rotational lamination guide pins provided to an upper die is within the width of the band-shaped plate to be stamped 40, the die apparatus as a whole can be made narrow.

In the first and second embodiments, the rotational lamination can be performed by either 180 degrees or 90 degrees.

The present invention is not limited to the above-described embodiments and various changes may be made to the configuration without departing from the spirit of the present invention. For example, the present invention may also be applied to cases where the dimensions, the number of the rotational lamination guide holes, the number of the temporary holes, or the rotational lamination angle is changed.

Furthermore, in the above-described embodiments, the two large and small core pieces are manufactured from a part of the band-shaped plate to be stamped, however, the present invention is also applicable to cases where only one or three or more core pieces are manufactured. In the above-described embodiments, the temporary holes are formed in the outer region of the core piece, however, they may be formed in an inner region of the core piece. Still furthermore, in the above-described embodiments, although the forming of the pilot holes is carried out simultaneously with the forming of the temporary holes, the forming of the temporary holes and the forming of the pilot holes may be performed separately.

INDUSTRIAL APPLICABILITY

Since the positioning mechanism for the blanking die is disposed inward from the both ends in the width direction of the band-shaped material to be stamped, the die apparatus can be reduced in size in the width direction and the downsized die apparatus can be provided. Consequently, the die apparatus which is relatively low-priced and requires less installation space can be provided.

REFERENCE SIGNS LIST

10: band-shaped plate to be stamped, 11,12: pilot hole, 13-16: temporary hole, 18: core piece, 19: center, 20: core piece, 21: blanking die, 23-30: rotational lamination guide hole, 40: band-shaped plate to be stamped, 41,42: pilot hole, 43,44: temporary hole, 45,46: core piece, 48: blanking die

The invention claimed is:

1. A laminated core manufacturing method for performing rotational lamination by conveying a band-shaped material to be stamped to a die apparatus to successively perform presswork, stamping out and dropping of one or more core pieces into a blanking die and rotating the blanking die by a predetermined angle, the method comprising:
    disposing a positioning mechanism for the blanking die inward from both ends in a width direction of the band-shaped material to be stamped, the positioning mechanism including rotational lamination guide pins and rotational lamination guide holes;
    providing the band-shaped material to be stamped with temporary holes; and
    inserting the rotational lamination guide pins through respective temporary holes provided in the band-shaped material to be stamped and into the rotational lamination guide holes to perform positioning of the blanking die in a rotation direction, the rotational lamination guide pins being loosely fitted in the temporary holes.

2. The laminated core manufacturing method as defined in claim 1, wherein a plurality of the core pieces having different outer diameters are concentrically stamped out from the band-shaped material to be stamped.

3. The laminated core manufacturing method as defined in claim 1, wherein forming of the temporary holes is carried out simultaneously with forming of pilot holes used for producing the core piece.

4. The laminated core manufacturing method as defined in claim 1, wherein the temporary holes are formed in an outer region of the one or more core pieces.

5. The laminated core manufacturing method as defined in claim 1, wherein the temporary holes are formed in an inner region of the one or more core pieces.

6. A laminated core manufacturing apparatus for performing rotational lamination by conveying a band-shaped material to be stamped to a die apparatus to successively perform presswork, stamping out and dropping of one or more core pieces into a blanking die and rotating the blanking die by a predetermined angle, the apparatus comprising:
    a positioning mechanism for the blanking die, the positioning mechanism being disposed inward from both ends in a width direction of the band-shaped material to be stamped and including rotational lamination guide pins and rotational lamination guide holes,
    wherein the band-shaped material to be stamped is configured with temporary holes arranged at positions at which the rotational lamination guide pins are respectively fitted in the rotational lamination guide holes through the temporary holes provided in the band-shaped material to be stamped, the rotational lamination guide pins being loosely fitted in the temporary holes.

* * * * *